UNITED STATES PATENT OFFICE.

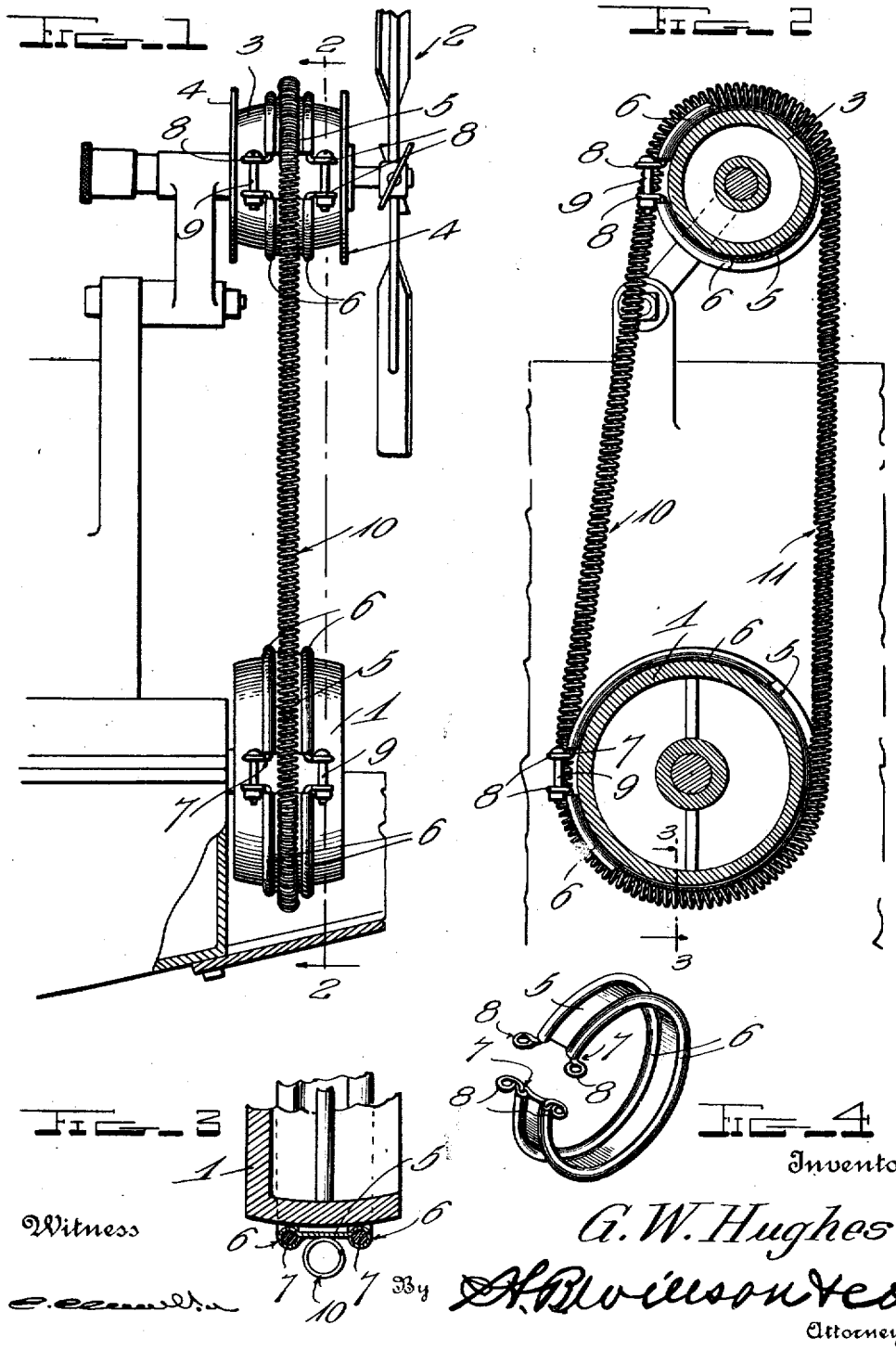

GEORGE W. HUGHES, OF WEST PHILADELPHIA, PENNSYLVANIA.

PULLEY ADAPTER.

1,422,360.  Specification of Letters Patent.  Patented July 11, 1922.

Application filed August 11, 1921. Serial No. 491,494.

*To all whom it may concern:*

Be it known that I, GEORGE W. HUGHES, a citizen of the United States, residing at West Philadelphia, in the county of Philadelphia and State of Pennsylvania, have invented certain new and useful Improvements in Pulley Adapters; and I do declare the following to be a full, clear, and exact description of the invention, such as will enable others skilled in the art to which it appertains to make and use the same.

The object of the present invention is to provide a unique form of adapter by whose use an ordinary pulley used in connection with a flat belt may be converted for use with a round resilient belt preferably formed of spring wire, the invention being primarily designed for use upon the fan belt pulleys of Ford automobiles.

With the foregoing in view, the invention resides in the novel subject matter hereinafter described and claimed, the descriptive matter being supplemented by the accompanying drawings.

Figure 1 is a side elevation of a portion of an automobile motor showing the fan belt pulleys thereon equipped with adapters constructed in accordance with the present invention and illustrating a resilient belt upon said adapters.

Figure 2 is a vertical sectional view as indicated by line 2—2 of Fig. 1.

Figure 3 is an enlarged detail sectional view as designated by line 3—3 of Fig. 2.

Figure 4 is a perspective view of one of the adapters.

In the drawings above briefly described, I have shown a conventional form of automobile motor whose drive shaft is equipped with the usual fan belt pulley 1 while the shaft of the fan 2 is provided with a smaller pulley 3 having end flanges 4. As usual, the outer sides of both pulleys are convex transversely to an extent which has been exaggerated, however, in the present drawing.

Each of the pulleys is equipped with one of the unique adapters which constitute the gist of the present invention and since the only difference between the upper and lower adapters, is one of size, I have used the same reference characters upon them. The numeral 5 designates a split ring preferably formed of sheet metal with its edges rolled to provide parallel beads 6 within which re-inforcing wires 7 are positioned, the ends of said wires being bent laterally outward and forming eyes 8 through which bolts 9 are adapted to pass for tightly contracting the ring 5 around the pulley. As shown clearly in Figs. 3 and 4, the beads 6 project inwardly to some extent from the ring 5 for contact with the pulley so as to well adapt said ring to the transverse curvature of said pulley. The beads also extend outwardly from the ring 5 so as to form guides for the fan belt 10. This belt is preferably formed from a single coiled spring with one end reduced at 11 and threaded into its other end. A spring belt is preferable since it automatically takes up any wear and remains tight at all times so that the fan 2 will be driven in a manner to produce the maximum cooling efficiency.

From the foregoing, taken in connection with the accompanying drawings, it will be seen that I have provided an extremely simple and inexpensive, yet a highly efficient and reliable device for adapting pulleys originally designed for flat belts, for use in connection with round resilient belts. Excellent results have been obtained from the details disclosed and they are therefore preferably followed, but it is to be understood that within the scope of the invention as claimed, numerous minor changes may be made.

I claim:

1. An adapter of the class described, comprising a split ring having its edges rolled to provide beads which project both inwardly and outwardly from said ring, the inner portions of said beads being adapted to contact with a transversely curved pulley, while the other portions of said beads constitute belt retaining means, and means for contracting said ring around the pulley.

2. An adapter of the class described, comprising a split ring adapted to surround the pulley, said ring having beads, reinforcing wires within said beads having their ends extended laterally from the beads and formed into eyes, and bolts for passage through said eyes to contract said ring upon the pulley.

In testimony whereof I have hereunto set my hand.

GEORGE W. HUGHES.